(No Model.)  2 Sheets—Sheet 1.
F. C. STARKE & P. J. CROWLEY.
METHOD OF AND DEVICE FOR THE APPLICATION OF CABLE POWER TO STEAM SHOVELS.
No. 272,790. Patented Feb. 20, 1883.
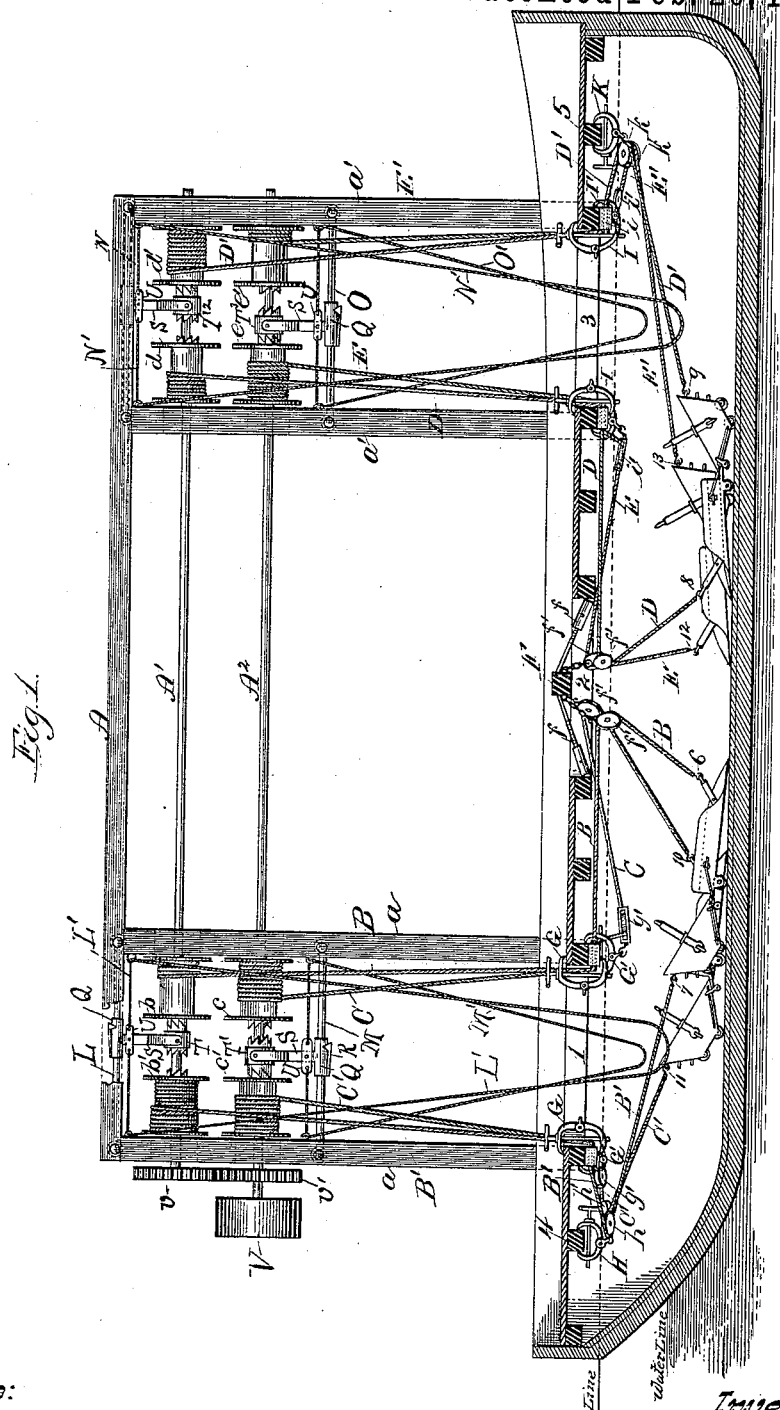

(No Model.) 2 Sheets—Sheet 2.
F. C. STARKE & P. J. CROWLEY.
METHOD OF AND DEVICE FOR THE APPLICATION OF CABLE POWER TO STEAM SHOVELS.
No. 272,790. Patented Feb. 20, 1883.
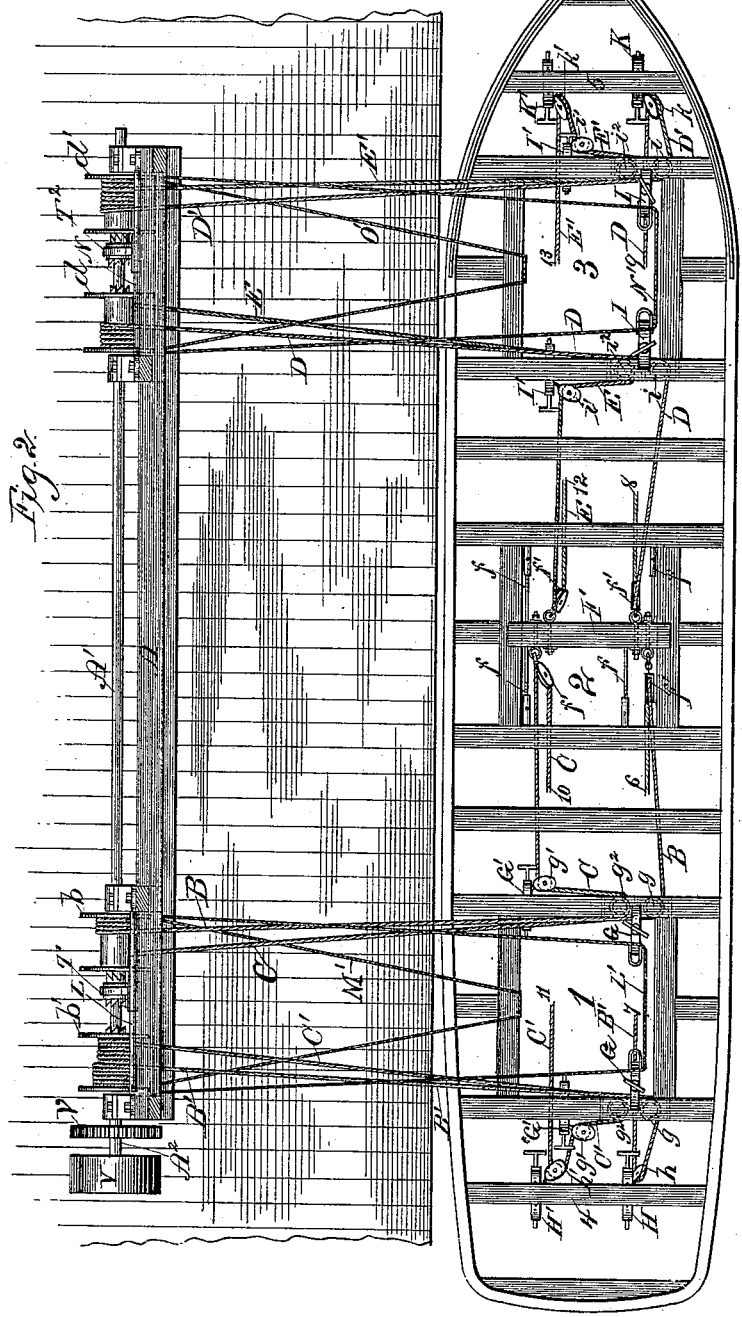
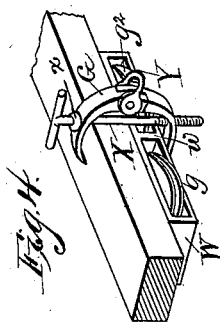
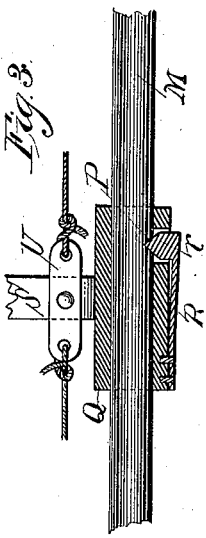
Witnesses:
E. G. Asmus
Adolph Klein
Inventors:
Fred C. Starke,
Peter J. Crowley,
By Stout & Underwood
Attorneys.

UNITED STATES PATENT OFFICE.

FRED. C. STARKE AND PETER J. CROWLEY, OF MILWAUKEE, WISCONSIN.

METHOD OF AND DEVICE FOR THE APPLICATION OF CABLE-POWER TO STEAM-SHOVELS.

SPECIFICATION forming part of Letters Patent No. 272,790, dated February 20, 1883.

Application filed January 15, 1883. (No model.)

*To all whom it may concern:*

Be it known that we, FRED. C. STARKE and PETER J. CROWLEY, both of Milwaukee, in the county of Milwaukee, and in the State of Wisconsin, have invented certain new and useful Improvements in Methods of and Devices for the Application of Cable-Power to Steam-Shovels; and we do hereby declare that the following is a full, clear, and exact description thereof.

Our invention relates principally to the unloading of vessels; and it consists in the manner of applying cable-power to steam-shovels adapted to work therein, as well as in certain peculiarities in the construction of the devices used, all as will be more fully set forth hereinafter.

In the drawings, Figure 1 represents our trestle-work, shafting, and drums in elevation, together with a section of a vessel with the starboard side of the hull removed, showing the manner in which our power is applied. Fig. 2 is a plan view of the same, and Figs. 3 and 4 are details.

A represents our trestle-work, consisting of uprights $a$ $a$ and $a'$ $a'$, arranged in pairs and connected and strengthened by ordinary crossbeams. This trestle-work, which is for the purpose of sustaining our drums, &c., is to be permanently secured to the dock, or wherever vessels are to be unloaded. $A'$ $A^2$ are the shafts, journaled in said trestle to support the drums $b$ $b'$, $c$ $c'$, $d$ $d'$, and $e$ $e'$. The four drums nearest the center of the trestle, $b$ $c$ $d$ $e$, serve to pull their respective shovels and buckets forward to the center of the vessel, when empty, for loading, while the end drums, $b'$ $c'$ $d'$ $e'$, serve to pull the said shovels and buckets, after the latter are loaded, back to their respective hatchways near each end of the vessel.

The buckets and shovels used in connection with our invention are substantially such as were patented to us September 5, 1882, and hence call for no special description here; but it is necessary to explain exactly how they are connected to the drums. We have shown in our drawings a vessel with three hatchways—the after-hatch 1, midships hatch 2, and fore-hatch 3. Across the midships hatch 2 we place a timber, F, called a "strong-back," whose ends rest on the fore-and-aft combing of said hatch, and which is braced in position by means of four sleeve-screws, $f$ $f$ $f$ $f$, bearing against the sides of said strong-back, and against the inner surface of the thwartships combing of the said hatch. The object of using the strong-back is to relieve the deck-frame from strain in the early operation of the shovels. Through this strong-back four eyebolts pass, and are securely bolted thereto by means of nuts and washers, and the eyes in said bolts receive the hooked ends of the lead-blocks $f'$ $f'$ $f'$ $f'$.

To the thwartships combings of the after-hatch 1, on the starboard side, are secured the clamps G G, supporting the sister lead-blocks containing two sheaves, $g$ $g^2$, of the construction most clearly shown in the detail view, Fig. 4, the position of said parts being represented in Fig. 1 and (partly in dotted lines) in Fig. 2, while on the same combings, but on the port side of said hatch, are the clamps $G'$ $G'$, supporting the single lead-blocks $g'$, while to one of the deck-beams (here marked 4) aft of the said after-hatch are secured the clamp H, supporting the lead-block $h$ on the starboard side, and the clamp H', supporting the lead-block $h'$ on the port side.

The arrangement of clamps and lead-blocks about the fore-hatch 3 corresponds exactly to the described arrangement about the after-hatch 1; but for the sake of clearness we have designated the starboard clamps on this hatch I I, which support the sister lead-blocks, each containing two sheaves, $i$ $i^2$, while the port-side clamps are marked $I'$ $I'$, and their single lead-blocks $i'$ $i'$, and the forward deck-beam, to which we attach other clamps, is here marked 5, and the starboard clamp on said beam is marked K and its lead-block $k$, while the port clamp is marked $K'$ and its lead-block $k'$.

To operate the four shovels and buckets herein illustrated eight cables are necessary—or, in other words, there must be two cables to every shovel and bucket employed, whatever number is used. Hence we do not limit ourselves at all to the number employed, but have shown four sets of drums and four buckets and shovels, as a convenient number for ordinary-sized vessels, two of the shovels and buckets being operated from each of the end hatches here shown, to and from the center of the vessel. The lead of our cables is a point of the utmost importance, and in the illustration shown is as follows: From the drum $b$ cable B leads to the off-shore sheave $g$ in the sister lead-block secured to the forward combing of the after-hatch 1; thence forward to the nearest lead-block $f'$ on the after side of the starboard end of the strong-back F, and around the sheave in said block and back to the bail of the starboard after-shovel at 6, while the cable B' leads from the drum $b'$ around the corresponding off-shore sheave, $g$, in the sister lead-blocks secured to the starboard end of the after-combing of the after-hatch 1; thence aft and around the sheave in block $h$, and then forward to the rear of the starboard after bucket or receiver at 7. Similarly the cable D leads from the drum $d$ to the off-shore sheave $i$ in the sister lead-block secured to the after-combing of the fore-hatch 3; thence aft to the nearest lead-block $f'$ on the forward side of the starboard end of the strong-back F, and around the sheave in said block and forward to the bail of the starboard forward shovel at 8, while the cable D' leads from the drum $d'$ to and around the corresponding off-shore sheave, $i$, in the sister lead-block secured to the starboard end of the forward combing of the fore-hatch 3; thence forward to and around the sheave $k$ and back to the rear end of the starboard forward bucket at 9. So much for the starboard cables and the shovels and buckets operated by them. The buckets and shovels on the port side of the vessel are operated by the cables in similar manner.

The cable C leads from the drum $c$ to and around the sister sheave $g^2$ on the starboard side of the forward combing of the after-hatch 7, thence around the sheave $g'$ on the port side of the said combing, thence forward to and through the nearest lead-block $f'$ on the after side of the port end of the strong-back F, and back to the bail of the port after-shovel at 10, while the cable C' leads from its drum $c'$ to and around the sister sheave $g^2$ on the starboard side of the after-combing of the after-hatch 1, thence around the sheave $g'$ on the port side of said combing, thence aft and around the sheave $h'$, and forward to the rear end of the port after receiver or bucket at 11. In similar manner the cable E leads from its drum $e$ to and around the sister sheave $i^2$, secured to the starboard side of the after-combing of the fore-hatch 3, and thence back and around the sheave $i'$ on the port side of said combing, and aft to and through the lead-block $f'$ on the forward side of the port end on the strong-back F, and forward again to the bail of the port forward shovel at 12, while the cable E' leads from its drum $e'$ to and around the sister sheave $i^2$ on the starboard side of the forward combing of the fore-hatch 3, and thence around the sheave $i'$ on the port side of said combing and forward to and around the sheave $k'$, and thence aft to the rear of port forward bucket at 13.

We will next describe our clutch mechanism.

Between the uprights $a\ a$, above the drums on the shaft A', we fasten a rod, L, while between the same uprights, but below the drums on the shaft A², we secure another rod, M. Similarly between the uprights $a'\ a'$ we secure two other rods, one, N, above the upper drums, and the other, O, below the lower drums on that side. These rods L M N O we term the "clutch-guides," and they are each provided, at about their centers, with a short transverse groove, P, as shown in the detail view Fig. 3, and each of the rods or clutch-guides is surrounded by a sleeve, Q, bearing a spring-catch, R, whose pointed head $r$ is adapted to fit into the described groove P, for a purpose to be afterward described. S is an arm rigidly attached to the sleeve Q, and forked at the other end to receive the sleeve of the clutch T, (or T' T² T³, as the case may be,) while the said arm S carries, near the sleeve Q, a plate, U, parallel with the sleeve Q, and having an eye in each end, to which eyes are attached ends of the clutch-ropes L', M', N', and O', respectively.

Power to turn the shafts A' A², which support the drums, need only be applied at one point—at V—the gears $v\ v'$ on the shaft A' A² meshing with each other, as shown, and this power is constant, and applied so as to always revolve each shaft in one direction, while by means of our clutch mechanism we operate any or all of the drums at will. For illustration, if we want to pull the after shovels and buckets forward into the coal or other material toward the center of the vessel, we pull on the right-hand portions of the clutch-ropes L' and M', which instantly connects the clutches T and T' with the drums $b$ and $c$, and the revolution of these drums will then, through the power-cables B and C, pull the said shovels forward, loading their buckets or receivers, and then by pulling on the left-hand portions of the same clutch-ropes, L' and M', the clutches T and T' will engage with the drums $b'$ and $c'$, and the revolution of these latter drums will then, through the power-cables B' and C', instantly reverse the draft and draw the after-shovels and loaded buckets back to the after-hatch, where the buckets can be disengaged from the shovels and power-cables and hoisted up, emptied, and returned to place. Similarly the forward buckets and shovels can be likewise operated by means of the forward clutch-ropes, N' O', forward clutches, T² T³, forward drums, $d\ e\ d'\ e'$, and forward power-cables, D E D' E'. When it is required to disengage the buckets for hoisting, &c., it is desirable that the drums should be idle, and hence, as the shafts A' and A² are always revolving, we then pull on our clutch-ropes, so that the clutches will be drawn midway on the shafts between the drums, when the spring-catches R will operate, and their pointed heads $r$ will instantly snap into the grooves P, and thus guard against accidental disengagement by jarring or motion of the shafts, while at the same time a vigorous pull at the clutch-ropes will serve to instantly free the clutches from the catches R and permit them to be pulled to the right or left as soon as it is necessary to again connect the said clutches with any of the drums.

When a vessel is full it is necessary to remove a portion of the coal or other cargo in order to obtain room for the operation of our shovels and buckets, and to accomplish this we first make use of our breaking-down shovels; but as these shovels are of a wholly different construction from those herein illustrated we will not further refer to them here, but reserve them for a separate application, merely stating that they work athwartships, and that we utilize our present power by attaching lead-blocks to the port and starboard combings of the different hatches, (of which there may be any number, according to the size of the vessel,) and thereby remove sufficient of the cargo to secure room for the proper adjustment and operation of our devices herein shown.

Our sister lead-blocks and clamps illustrated in the detail views, Fig. 4, are of novel construction, and are thus made: The sheaves $g$ and $g^2$ are journaled parallel to each other within a shell or casing, W, with a partition, $w$, to separate the sheaves and strengthen the casing, and the clamp G consists of a crescent-shaped plate, perforated in each horn for the reception of a bolt, X, having flange $x$ near its upper end, and screw-threaded at its lower end, the lower perforation in the crescent-plate being similarly screw-threaded, while the upper part of the bolt and the upper perforation are both plain. The said bolt is provided at its top with a bar or other device to enable it to be easily turned, and the crescent-plate is furnished at its center with a shackle, Y, the loop of which is adapted to receive a rope, or the hook of a lead-block, &c.

In the illustration we have here given of our invention we have taken a vessel lying with its port side to the dock; but it will of course be understood that the reverse of our arrangement would be necessary if the vessel lay starboard side to the dock, in which event all our port blocks would be put on the starboard side, and vice versa.

Having thus described our invention, what we claim as new, and desire to secure by Letters Patent, is—

1. In combination with a trestle-work supporting revolving drums, the rods or clutch-guides arranged in vertical line with the shafts of the drums, and provided at about their centers with short transverse grooves P, and surrounded by sleeves Q, bearing spring-catches R $r$, and connected by arms S with clutches on the drum-shafts, said arms carrying plates U, perforated to receive the clutch-ropes, substantially as set forth.

2. In combination with a trestle-work for supporting the shafts of revolving drums, and a steam-shovel and its bucket or receiver, a drum with a cable leading therefrom and passing through lead-blocks to a point forward of the shovel and then aft to the bail of said shovel, and another drum having a cable leading therefrom and passing through lead-blocks to a point aft of the bucket, and then forward to the rear of said bucket, substantially as and for the purpose set forth.

3. In combination with a trestle-work for supporting the shafts of revolving drums, and a steam-shovel and its bucket or receiver, a drum with a cable leading therefrom and passing through lead-blocks to a point aft of the shovel, and thence forward to the bail of said shovel, and another drum having a cable leading therefrom and passing through lead-blocks to a point forward of the bucket and then aft to the rear of the said bucket, substantially as and for the purpose set forth.

4. The combination of the trestle A, revolving shaft A', drums $b$ $b'$, cables B B', clamps G G, with lead-blocks $g$ $g$, strong-back F, with lead-block $f'$, clamp H, with lead-block $h$, and shovel and bucket, all connected together, and adapted to operate substantially as set forth.

5. The combination of the trestle A, revolving shaft A$^2$, drums $c$ $c'$, cables C C', clamps G G, with lead-blocks $g^2$ $g^2$, clamps G' G', with lead-blocks $g'$ $g'$, strong-back F, with lead-block $f'$, clamp H', with lead-block $h'$, and shovel and bucket, all connected together, and adapted to operate substantially as set forth.

6. The combination of the trestle A, revolving shaft A', drums $d$ $d'$, cables D D', clamps I I, with lead-blocks $i$ $i$, strong-back F, with lead-block $f'$, clamp K, with lead-block $k$, and shovel and bucket, all connected together, and adapted to operate substantially as set forth.

7. The combination of the trestle A, revolving shaft A$^2$, drums $e$ $e'$, cables E E', clamps I I, with lead-blocks $i^2$ $i^2$, clamps I' I', with lead-blocks $i'$ $i'$, strong-back F, with lead-block $f'$, and shovel and bucket, all connected together, and adapted to operate substantially as set forth.

8. The clamp G, consisting of a crescent-shaped plate provided at its center with a shackle, Y, and perforated in each horn of the crescent for the reception of a bolt, X, having flange $x$ near its upper end, and screw-threaded at its lower end, the lower perforation in the crescent-plate being correspondingly screw-threaded, while the upper part of the bolt and the upper perforation are plain, substantially as set forth.

In testimony that we claim the foregoing we have hereunto set our hands, on this 13th day of November, 1882, in the presence of two witnesses.

FRED. C. STARKE.
PETER J. CROWLEY.

Witnesses:
STANLEY S. STOUT,
H. G. UNDERWOOD.